(12) United States Patent
Cho et al.

(10) Patent No.: US 9,488,250 B2
(45) Date of Patent: Nov. 8, 2016

(54) MULTI-STAGE TRANSMISSION FOR VEHICLE

(71) Applicant: HYUNDAI MOTOR COMPANY, Seoul (KR)

(72) Inventors: Won Min Cho, Hwaseong-si (KR); Jae Chang Kook, Hwaseong-si (KR); Myeong Hoon Noh, Seongnam-si (KR); Seong Wook Ji, Ansan-si (KR); Kang Soo Seo, Yongin-si (KR); Seong Wook Hwang, Gunpo-si (KR)

(73) Assignee: HYUNDAI MOTOR COMPANY (KR)

( * ) Notice: Subject to any disclaimer, the term of this patent is extended or adjusted under 35 U.S.C. 154(b) by 0 days.

(21) Appl. No.: 14/875,113

(22) Filed: Oct. 5, 2015

(65) Prior Publication Data
US 2016/0252162 A1    Sep. 1, 2016

(30) Foreign Application Priority Data
Feb. 27, 2015    (KR) ........................ 10-2015-0027959

(51) Int. Cl.
*F16H 3/66*    (2006.01)
(52) U.S. Cl.
CPC ......... *F16H 3/66* (2013.01); *F16H 2200/0069* (2013.01); *F16H 2200/2012* (2013.01); *F16H 2200/2046* (2013.01)

(58) Field of Classification Search
CPC ............. F16H 3/66; F16H 2200/2046; F16H 2200/2012; F16H 2200/0069
USPC .......................................... 475/275–291, 330
See application file for complete search history.

(56) References Cited

U.S. PATENT DOCUMENTS

| | | | |
|---|---|---|---|
| 8,303,455 B2 | 11/2012 | Gumpoltsberger et al. | |
| 2013/0231215 A1* | 9/2013 | Coffey | F16H 3/66 475/276 |
| 2014/0182415 A1* | 7/2014 | Griesmeier | B60K 6/365 74/661 |

FOREIGN PATENT DOCUMENTS

| | | | | |
|---|---|---|---|---|
| DE | 102010063634 A1 * | 6/2012 | ............. | F16H 3/666 |
| DE | 102012218687 A1 * | 4/2014 | ............. | F16H 3/66 |
| JP | 2013-204710 | 10/2013 | | |
| JP | 2013-204711 | 10/2013 | | |
| KR | 10-2013-0031455 | 3/2013 | | |
| KR | 10-1448789 | 10/2014 | | |

* cited by examiner

*Primary Examiner* — Roger Pang
(74) *Attorney, Agent, or Firm* — Brinks Gilson & Lione

(57) ABSTRACT

The present disclosure is a multi-stage transmission for a vehicle that has at least ten forward shifting stages and one reverse shifting stage. The multi-stage transmission has a relatively small number of parts and a simple configuration such that an engine may be operated at desired operation, thereby providing an improvement in the fuel efficiency of the vehicle, and the engine may be operated more quietly, thereby improving the quietness of the vehicle.

7 Claims, 2 Drawing Sheets

*FIG. 2*

Figure 1:
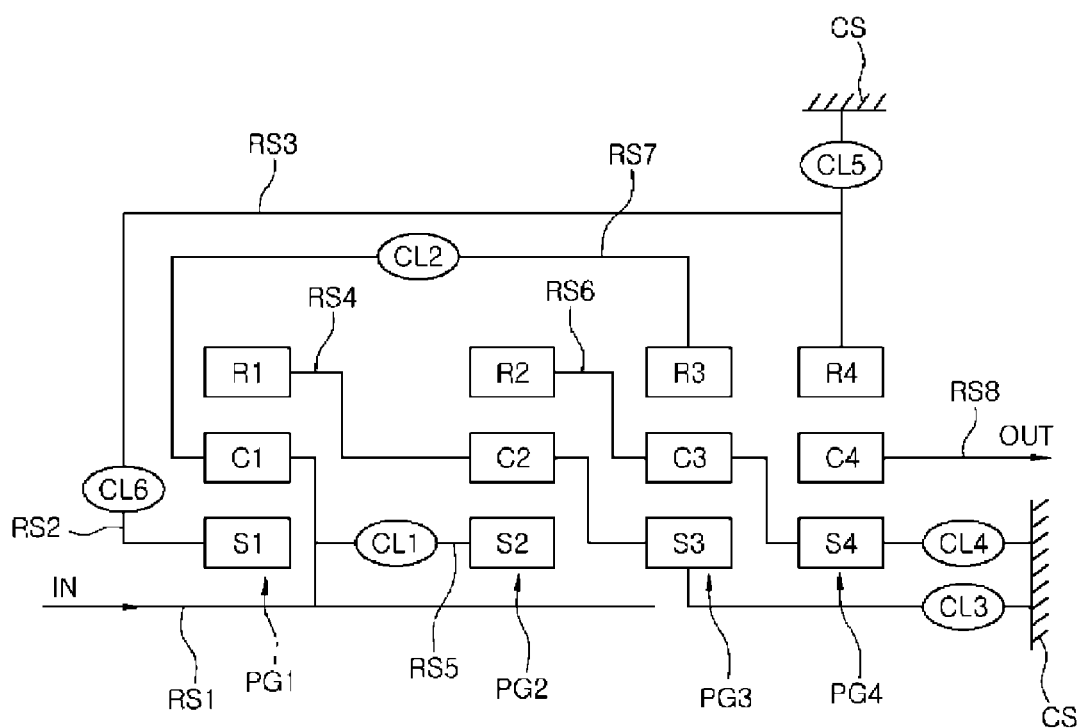

| SHIFTING STAGE | CL1 | CL2 | CL3 | CL4 | CL5 | CL6 | GEAR RATIO |
|---|---|---|---|---|---|---|---|
| 1ST |  | O | O |  | O |  | 4.167 |
| 2ND | O | O |  |  | O |  | 2.500 |
| 3RD |  | O |  |  | O | O | 1.974 |
| 4TH | O |  |  |  | O | O | 1.239 |
| 5TH | O | O |  |  |  | O | 1.000 |
| 6TH | O |  |  | O |  | O | 0.841 |
| 7TH | O |  | O |  |  | O | 0.776 |
| 8TH |  |  | O | O |  | O | 0.667 |
| 9TH |  | O | O |  |  | O | 0.575 |
| 10TH |  | O |  | O |  | O | 0.351 |
| REV | O |  | O |  | O |  | 4.750 |

MULTI-STAGE TRANSMISSION FOR VEHICLE

CROSS-REFERENCE TO RELATED APPLICATIONS

This application claims priority to Korean Patent Application No. 10-2015-0027959, filed on Feb. 27, 2015, the entire contents of which are incorporated herein by reference.

FIELD

The present disclosure generally relates to a multi-stage transmission for a vehicle.

BACKGROUND

The statements in this section merely provide background information related to the present disclosure and may not constitute prior art.

Recent rising oil prices have driven car manufacturers worldwide into competition to improve fuel efficiency. In addition, great efforts have been made to reduce the weight and improve the fuel efficiency of engines based on a variety of techniques such as downsizing, and similar measures.

Meanwhile, among methods utilized for transmissions equipped in vehicles to improve fuel efficiency, there is a method allowing an engine to operate at more efficient operation points using a multi-stage transmission, thereby improving the fuel efficiency and allowing an engine to operate in a relatively low RPM (revolutions per minute) range.

However, as the number of shifting stages of a transmission increases, the number of internal parts constituting the transmission also increases. This may lead to undesirable effects, such as the reduced mountability and transfer efficiency, and the increased cost and weight of the transmission.

SUMMARY

The present disclosure provides a multi-stage transmission for a vehicle that has at least ten forward shifting stages and one reverse shifting stage with a relatively small number of parts, and a simple configuration such that an engine may be operated at desired operation points, thereby providing an improvement in the fuel efficiency of the vehicle, and the engine may be operated more quietly, thereby improving the quietness of the vehicle.

According to one form of the present disclosure, there is provided a multi-stage transmission for a vehicle including: an input shaft; an output shaft; first through fourth planetary gear devices disposed between the input shaft and the output shaft to transmit rotary force. Each of the first through fourth planetary gear devices has three rotary elements, and at least six shifting elements connected to the rotary elements of the planetary gear devices. A first rotary element of the first planetary gear device stays connected to a third rotary element of the fourth planetary gear device, a second rotary element of the first planetary gear device stays connected to the input shaft and variably connected to a first rotary element of the second planetary device and a third rotary element of the third planetary device, respectively, a third rotary element of the first planetary gear device stays connected to a second rotary element of the second planetary gear device. The second rotary element of the second planetary gear device stays connected to a first rotary element of the third planetary gear device, and a third rotary element of the second planetary gear device stays connected to a second rotary element of the third planetary gear device. The first rotary element of the third planetary gear device is installed to be selectively fixable by one of the at least six shifting elements, and the second rotary element the third planetary gear device stays connected to a first rotary element of the fourth planetary gear device. The first rotary element of the fourth planetary gear device is installed to be selectively fixable by another of the at least six shifting elements. A second rotary element of the fourth planetary gear device stays connected to the output shaft, and the third rotary element of the fourth planetary gear device is installed to be fixable by further another of the at least six shifting elements.

According to the present disclosure, as set forth above, the multi-stage transmission for a vehicle can realize at least ten forward shifting stages and one reverse shifting stage with a relatively small number of parts and a simple configuration such that the engine may be operated at optimum operation points, thereby maximizing an improvement in the fuel efficiency of the vehicle, and the engine may be operated more quietly, thereby improving the quietness of the vehicle.

DRAWINGS

In order that the disclosure may be well understood, there will now be described various forms, given by way of example, references being made to the accompanying drawings, in which:

FIG. 1 is a diagram illustrating the configuration of a multi-stage transmission for a vehicle according to in one form of the present disclosure; and FIG. 2 illustrates an operation mode table of the transmission shown in FIG. 1.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 and 2, a multi-stage transmission for a vehicle according to one form of the present disclosure may include an input shaft "IN"; an output shaft "OUT"; a first through fourth planetary gear devices "PG1", "PG2", "PG3" and "PG4" disposed between the input shaft "IN" and the output shaft "OUT" to transmit rotary force. Each of the first through fourth planetary gear devices, PG1, PG2, PG3 and PG4, has three rotary elements, and at least six shifting elements, e.g. clutches CL1-CL6, connected to the rotary elements of the first through fourth planetary gear devices, PG1-PG4.

A first rotary element S1 of the first planetary gear device PG1 is variably connected (i.e. is selectively, intermittently connected) to a third rotary element R4 of the fourth planetary gear device PG4. A second rotary element C1 of the first planetary gear device PG1 stays connected to the input shaft IN, and variably connected to a first rotary element S2 of the second planetary gear device PG2 and a third rotary element R3 of the third planetary gear device PG3, respectively. A third rotary element R1 of the first planetary gear device PG1 stays connected to a second rotary element C2 of the second planetary gear device PG2.

The second rotary element C2 of the second planetary gear device PG2 stays connected to a first rotary element S3 of the third planetary gear device PG3, and a third rotary element R2 of the second planetary gear device PG2 stays connected to a second rotary element C3 of the third planetary gear device PG3.

The first rotary element S3 of the third planetary gear device PG3 is installed to be selectively fixable by one shifting element of the at least six shifting elements and the second rotary element C3 of the third planetary gear device PG3 stays connected to a first rotary element S4 of the fourth planetary gear device PG4.

The first rotary element S4 of the fourth planetary gear device PG4 is installed to be selectively fixable by another rotary element of the at least six shifting elements. A second rotary element C4 of the fourth planetary gear device PG4 stays connected to the output shaft OUT. The third rotary element R4 of the fourth planetary gear device PG4 is installed to be selectively fixable by further another shifting element of the at least six shifting elements.

The first planetary gear device PG1, the second planetary gear device PG2, the third planetary gear device PG3 and the fourth planetary gear device PG4 are sequentially arranged along the axial direction of the input shaft IN and the output shaft OUT.

The first rotary element S3 of the third planetary gear device PG3 is installed to be selectively fixable to a transmission case CS by means of a third clutch CL3 from among the at least six shifting elements. The first rotary element S4 of the fourth planetary gear device PG4 is installed to be selectively fixable to the transmission case CS by means of a fourth clutch CL4 from among the at least six shifting elements. The third rotary element R4 of the fourth planetary gear device PG4 is installed to be selectively fixable to the transmission case CS by means of a fifth clutch CL5 from among the at least six shifting elements.

Therefore, the third clutch CL3, the fourth clutch CL4 and the fifth clutch CL5 function as brakes, respectively, such that the first rotary element S3 of the third planetary gear device PG3, the first rotary element S4 and the third rotary element R4 of the fourth planetary gear device PG4 may be converted to rotatable state or restrained state not to be rotated by means of the operations of the third clutch CL3, the fourth clutch CL4 and the fifth clutch CL5, respectively.

The other shifting elements, from among the at least six shifting elements, are configured to constitute variable connection structures between the rotary elements of the planetary gear devices.

Specifically, a first clutch CL1, from among the at least six shifting elements, forms a variable connection structure between the second rotary element C1 of the first planetary gear device PG1 and the first rotary element S2 of the second planetary gear device PG2. A second clutch CL2, from among the at least six shifting elements, forms a variable connection structure between the second rotary element C1 of the first planetary gear device PG1 and the third rotary element R3 of the third planetary gear device PG3. A sixth clutch CL6, from among the at least six shifting elements, forms a variable connection structure between the first rotary element S1 of the first planetary gear device PG1 and the third rotary element R4 of the fourth planetary gear device PG4.

According to this form, the first rotary element S1, the second rotary element C1 and the third rotary element R1 of the first planetary gear device PG1 are a first sun gear, a first carrier and a first ring gear, respectively. The first rotary element S2, the second rotary element C2 and the third rotary element R2 of the second planetary gear device PG2 are a second sun gear, a second carrier and a second ring gear, respectively. The first rotary element S3, the second rotary element C3 and the third rotary element R3 of the third planetary gear device PG3 are a third sun gear, a third carrier and a third ring gear, respectively. The first rotary element S4, the second rotary element C4 and the third rotary element R4 of the fourth planetary gear device PG4 are a fourth sun gear, a fourth carrier and a fourth ring gear, respectively.

The multi-stage transmission for a vehicle configured as above may also be presented as follows.

Specifically, the multi-stage transmission for a vehicle according to the present invention includes the first to fourth planetary gear devices PG1 to PG4 each having the three rotary elements; the six shifting elements configured to variably provide frictional force; and eight rotary shafts connected to the rotary elements of the first to fourth planetary gear devices.

Hence, from among the eight rotary shafts, the first rotary shaft RS1 is the input shaft IN directly connected to the second rotary element C1 of the first planetary gear device PG1. The second rotary shaft RS2 is directly connected to the first rotary element S1 of the first planetary gear device PG1. The third rotary shaft RS3 is directly connected to the third rotary element R4 of the fourth planetary gear device PG4. The fourth rotary shaft RS4 is directly connected to the third rotary element R1 of the first planetary gear device PG1, the second rotary element C2 of the second planetary gear device PG2 and the first rotary element S3 of the third planetary gear device PG3. The fifth rotary shaft RS5 is directly connected to the first rotary element S2 of the second planetary gear device PG2. The sixth rotary shaft RS6 is directly connected to the third rotary element R2 of the second planetary gear device PG2, the second rotary element C3 of the third planetary gear device PG3 and the first rotary element S4 of the fourth planetary gear device PG4. The seventh rotary shaft RS7 is the third rotary element R3 of the third planetary gear device PG3. The eighth rotary shaft RS8 is the output shaft OUT directly connected to the second rotary element C4 of the fourth planetary gear device PG4.

In addition, from among the six shifting elements, the first clutch CL1 is disposed between the first rotary shaft RS1 and the fifth rotary shaft RS5. The second clutch CL2 is disposed between the first rotary shaft RS1 and the seventh rotary shaft RS7. The third clutch CL3 is disposed between the fourth rotary shaft RS4 and the transmission case CS. The fourth clutch CL4 is disposed between the sixth rotary shaft RS6 and the transmission case CS. The fifth clutch CL5 is disposed between the third rotary shaft RS3 and the transmission case CS. The sixth clutch CL6 is disposed between the second rotary shaft RS2 and the third rotary shaft RS3.

As set forth above, the multi-stage transmission for a vehicle according to the present disclosure includes the four simple planetary gear devices and the six shifting elements that realize the ten forward shifting stages and the one reverse shifting stage according to the operation mode table as illustrated in FIG. 2. Since the multi-stage shifting stages of ten shifting stages can be embodied based on a relatively small number of parts and a simple configuration, the multi-stage transmission for a vehicle can contribute to the improved fuel efficiency and quietness of a vehicle, improving the marketability of the vehicle.

What is claimed is:
1. A multi-stage transmission for a vehicle comprising:
an input shaft;

an output shaft;
first, second, third and fourth planetary gear devices disposed between the input shaft and the output shaft to transmit rotary force, each of the first, second, third and fourth planetary gear devices having three rotary elements; and
at least six shifting elements connected to the rotary elements of the planetary gear devices,
wherein a first rotary element of the first planetary gear device is variably connected to a third rotary element of the fourth planetary gear device, a second rotary element of the first planetary gear device stays connected to the input shaft and variably connected to a first rotary element of the second planetary device and a third rotary element of the third planetary device, respectively, a third rotary element of the first planetary gear device stays connected to a second rotary element of the second planetary gear device,
wherein the second rotary element of the second planetary gear device stays connected to a first rotary element of the third planetary gear device, and a third rotary element of the second planetary gear device stays connected to a second rotary element of the third planetary gear device,
wherein the first rotary element of the third planetary gear device is installed to be selectively fixable by one shifting element of the at least six shifting elements, and the second rotary element the third planetary gear device stays connected to a first rotary element of the fourth planetary gear device, and
wherein the first rotary element of the fourth planetary gear device is installed to be selectively fixable by another shifting element of the at least six shifting elements, a second rotary element of the fourth planetary gear device stays connected to the output shaft, and the third rotary element of the fourth planetary gear device is installed to be selectively fixable by further another shifting element of the at least six shifting elements.

2. The multi-stage transmission according to claim 1, wherein the first planetary gear device, the second planetary gear device, the third planetary gear device and the fourth planetary gear device are sequentially arranged along an axial direction of the input shaft and the output shaft.

3. The multi-stage transmission according to claim 2, wherein:
the first rotary element of the third planetary gear device is installed to be selectively fixable to a transmission case by means of a third clutch of the at least six shifting elements,
the first rotary element of the fourth planetary gear device is installed to be fixable to the transmission case by means of a fourth clutch of the at least six shifting elements,
the third rotary element of the fourth planetary gear device is installed to be selectively fixable to the transmission case by means of a fifth clutch of the at least six shifting elements, and
the other shifting elements of the at least six shifting elements are configured to constitute variable connection structures between the three rotary elements of the planetary gear devices.

4. The multi-stage transmission according to claim 3, wherein:
a first clutch of the at least six shifting elements forms a variable connection structure between the second rotary element of the first planetary gear device and the first rotary element of the second planetary gear device,
a second clutch of the at least six shifting elements forms a variable connection structure between the second rotary element of the first planetary gear device and the third rotary element of the third planetary gear device, and
a sixth clutch of the at least six shifting elements forms a variable connection structure between the first rotary element of the first planetary gear device and the third rotary element of the fourth planetary gear device.

5. A multi-stage transmission for a vehicle comprising:
first, second, third and fourth planetary gear devices each having three rotary elements;
six shifting elements configured to variably provide frictional force; and
first, second, third, fourth, fifth, sixth, seventh and eighth rotary shafts connected between the rotary elements of the first, second, third and fourth planetary gear devices,
wherein the first rotary shaft is an input shaft directly connected to a second rotary element of the first planetary gear device,
the second rotary shaft is directly connected to a first rotary element of the first planetary gear device,
the third rotary shaft is directly connected to a third rotary element of the fourth planetary gear device,
the fourth rotary shaft is directly connected to a third rotary element of the first planetary gear device, a second rotary element of the second planetary gear device and a first rotary element of the third planetary device,
the fifth rotary shaft is directly connected to a first rotary element of the second planetary gear device,
the sixth rotary shaft is directly connected to a third rotary element of the second planetary gear device, a second rotary element of the third planetary gear device and a first rotary element of the fourth planetary gear device,
the seventh rotary shaft is directly connected to a third rotary element of the third planetary gear device, and
the eighth rotary shaft is an output shaft directly connected to a second rotary element of the fourth planetary gear device, and
wherein the six shifting elements include a first clutch, a second clutch, a third clutch, a fourth clutch, a fifth clutch, and a sixth clutch, the first clutch is disposed between the first rotary shaft and the fifth rotary shaft, the second clutch is disposed between the first rotary shaft and the seventh rotary shaft, the third clutch is disposed between the fourth rotary shaft and a transmission case, the fourth clutch is disposed between the sixth rotary shaft and the transmission case, the fifth clutch is disposed between the third rotary shaft and the transmission case, and the sixth clutch is disposed between the second rotary shaft and the third rotary shaft.

6. The multi-stage transmission according to claim 5, wherein the first planetary gear device, the second planetary gear device, the third planetary gear device and the fourth planetary gear device are sequentially arranged along an axial direction of the input shaft and the output shaft.

7. The multi-stage transmission according to claim 5, wherein the first clutch is disposed to form a variable connection between the second rotary element of the first planetary gear device and the first rotary element of the second planetary gear device, the second clutch is disposed to form a variable connection between the second rotary element of the first planetary gear device and the third rotary element of the third planetary gear device, and the sixth clutch is disposed to form a variable connection between the first rotary element of the first planetary gear device and the third rotary element of the fourth planetary gear device.

* * * * *